No. 672,374. Patented Apr. 16, 1901.
G. H. JERNIGAN.
PLOW FENDER.
(Application filed Feb. 16, 1901.)
(No Model.)
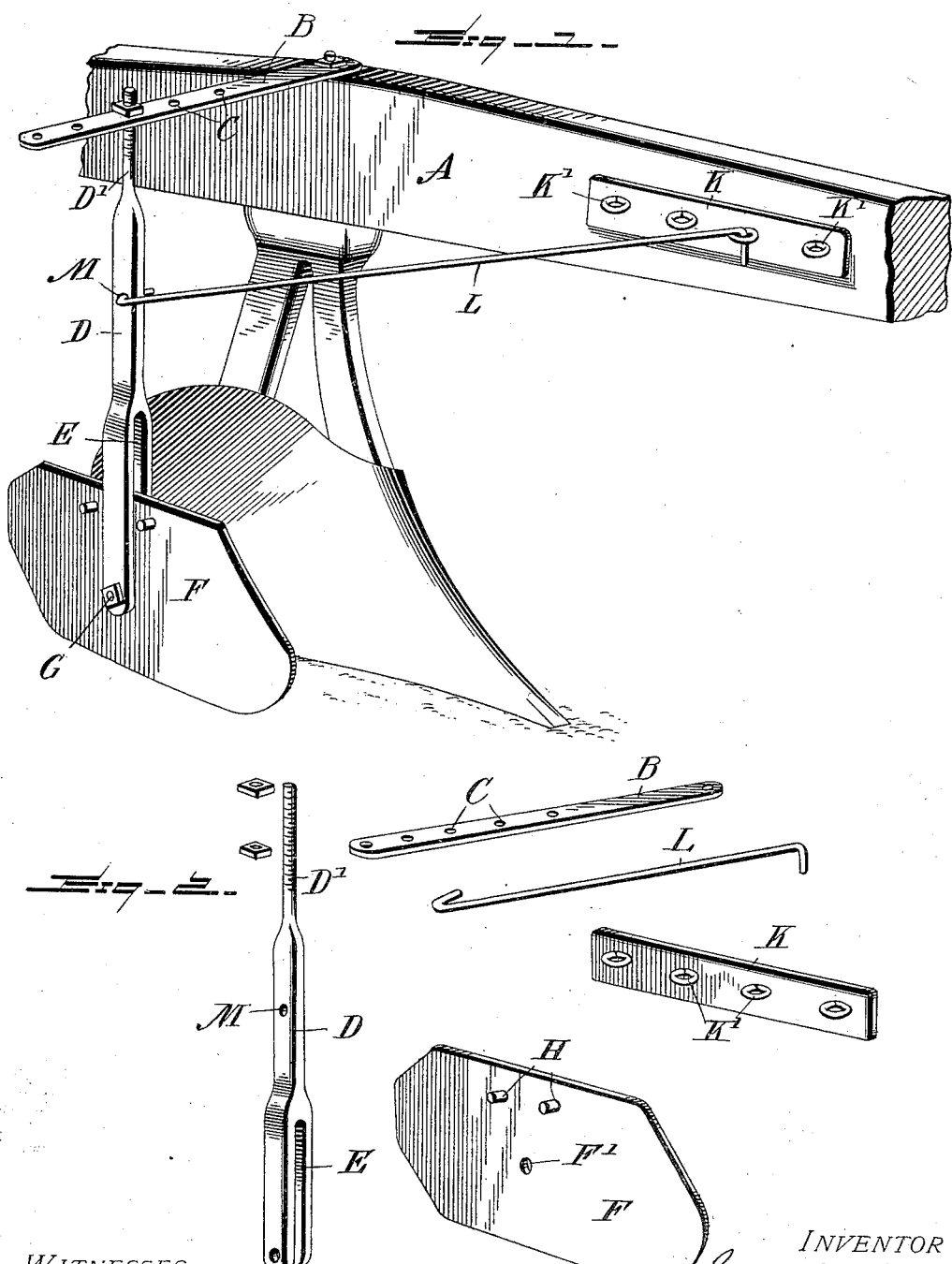
WITNESSES:
Wm. F. Doyle.
A. L. Hough.
INVENTOR
Geo. H. Jernigan,
BY Franklin N. Hough
Attorney

UNITED STATES PATENT OFFICE.

GEORGE H. JERNIGAN, OF MINGO, NORTH CAROLINA.

PLOW-FENDER.

SPECIFICATION forming part of Letters Patent No. 672,374, dated April 16, 1901.

Application filed February 16, 1901. Serial No. 47,619. (No model.)

*To all whom it may concern:*

Be it known that I, GEORGE H. JERNIGAN, a citizen of the United States, residing at Mingo, in the county of Sampson and State of North Carolina, have invented certain new and useful Improvements in Plow-Fenders; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in plow attachments, and especially to a fender which is designed to be attached to the beam of the plow and made adjustable, so that the fender may be raised or lowered or swung so as to be at different angles to the plow-beam; and the object of the invention is to protect young plants from the dirt as it is turned over by the plowshare.

The invention relates, further, to various details of construction, which will be hereinafter more fully described and then specifically defined in the appended claims.

The invention is clearly illustrated in the accompanying drawings, which, with the letters of reference marked thereon, form a part of this application, and in which—

Figure 1 is a perspective view showing my invention as applied to a plow-beam. Fig. 2 is a detail view of the fender and connecting parts.

Reference now being had to the details of the drawings by letter, A designates a plow-beam, to which is bolted a horizontally-disposed bar B, having apertures C therein adjacent to its outer free end.

D is a fender-supporting rod having a portion of its length threaded, as at D', and said threaded end is designed to be adjustably held in the apertures in said bar B, accordingly as it may be desired to hold the fender farther from or nearer to the plow. The lower end of said rod is slotted, as at E, to receive the fender F, which may be of any desired shape, which should have, however, its ends either inclined or curved. This fender-blade has an aperture F', through which a bolt G may be passed, said bolt also passing through registering apertures in the slotted portion of said rod, and when thus adjusted the bolt may be held in place by means of a nut held on the threaded end of the bolt. On either side of the slotted end of the rod, on one side of the fender-blade, are lugs H, which may be integral with or secured to said fender-blade, and these lugs are for the purpose of limiting the tilting motion of the blade lengthwise.

Fastened to the side of the plow-beam is a plate K, having a series of eyes K' thereon, and L is a rod having hooked ends, which is designed to engage at one end an eye on said plate L and with its other end to engage an aperture M in the fender-supporting rod. By means of this rod L it will be observed that the bar B, which is bolted at one end to the plow-beam, but which is allowed to swing on said bolt as a pivot, may be held in different positions coincident with the radii of a circle described by said bar, while by adjusting the nut on the fender-supporting rod the fender-blade may be raised or lowered.

By the use of a fender-blade of this construction attached to a plow it will be readily seen that young and tender plants may be protected from the furrow of earth which is turned over by the plowshare.

Having thus described my invention, what I claim to be new, and desire to secure by Letters Patent, is—

1. In combination with a plow-beam, a bar pivoted at one end to said beam, a threaded rod held in an aperture in said bar, the lower end of said rod being slotted, a fender-blade pivoted in said slot, a plate secured to the plow-beam and having eyes, a hooked rod connecting one of said eyes with the fender-supporting rod, as set forth.

2. In combination with the plow-beam, the bar pivoted at one end thereto, the fender-supporting rod, slotted at its lower end, the blade held in said slotted end, and lugs on the blade designed to strike against the edge of the rod to limit the tilting movement of said blade, and means for holding the pivoted bar in a fixed position, as shown and for the purpose set forth.

In testimony whereof I hereunto affix my signature in presence of two witnesses.

GEORGE H. JERNIGAN.

Witnesses:
V. L. STEPHENS,
L. P. JERNIGAN.